United States Patent
Eggert (12)

(10) Patent No.: US 6,562,509 B1
(45) Date of Patent: May 13, 2003

(54) MULTI-USE LEAD-ACID POWER PACK FOR USE WITH A CORDLESS POWER HAND TOOL AND OTHER LOADS

(75) Inventor: Daniel M. Eggert, Kenosha, WI (US)

(73) Assignee: Snap-on Technologies, Inc., Lincolnshire, IL (US)

(*) Notice: Subject to any disclaimer, the term of this patent is extended or adjusted under 35 U.S.C. 154(b) by 97 days.

(21) Appl. No.: 09/590,530

(22) Filed: Jun. 8, 2000

Related U.S. Application Data
(60) Provisional application No. 60/139,514, filed on Jun. 16, 1999.

(51) Int. Cl.⁷ .............................. H01M 2/10; H02J 7/00; H01R 11/06
(52) U.S. Cl. .............................. 429/96; 429/121; 429/7; 320/114; 439/504
(58) Field of Search .............................. 429/96, 97, 99, 429/100, 121, 7, 178, 179; 320/114, 113; 439/500, 504

(56) References Cited

U.S. PATENT DOCUMENTS

| | | |
|---|---|---|
| 3,963,972 A | 6/1976 | Todd |
| 3,999,110 A | 12/1976 | Ramstrom et al. |
| 4,004,208 A | 1/1977 | Tamminen |
| 4,547,894 A | 10/1985 | Benson et al. |
| 5,061,579 A | 10/1991 | Ishimoto |
| 5,169,225 A * | 12/1992 | Palm ........................... 362/118 |
| 5,504,412 A | 4/1996 | Chan et al. |
| 5,607,794 A | 3/1997 | Koenig |
| 5,683,831 A | 11/1997 | Baril et al. |
| 5,718,987 A * | 2/1998 | Misra et al. ................. 429/160 |
| 5,736,271 A | 4/1998 | Cisar et al. |
| 5,796,588 A | 8/1998 | Machida et al. |
| 5,942,352 A | 8/1999 | Neil et al. |
| 5,948,559 A | 9/1999 | Snyder |
| 6,075,341 A * | 6/2000 | White et al. ................. 320/114 |
| 6,139,359 A * | 10/2000 | Fuhreck et al. ............. 439/500 |
| 6,168,881 B1 * | 1/2001 | Fischer et al. ................. 429/97 |

* cited by examiner

Primary Examiner—Stephen Kalafut
Assistant Examiner—R Alejandro
(74) Attorney, Agent, or Firm—Seyfarth Shaw

(57) ABSTRACT

A multiple-use battery pack system includes a battery pack housing enclosing a lead-acid battery and a post portion projecting from the housing and adapted to be plugged into a cavity in an associated cordless power hand tool. First terminals on the post portion connect the battery to the tool circuitry when the post portion is plugged into the tool. When used for powering other loads, the post portion is plugged into a receptacle in an adapter housing, in which position either the first terminals or, alternatively, second terminals on the battery pack housing connect the battery to jumper cables on the adapter housing. Latch mechanisms on the battery pack housing cooperate with keepers on the associated hand tool for latching the battery pack in place thereon.

20 Claims, 3 Drawing Sheets

MULTI-USE LEAD-ACID POWER PACK FOR USE WITH A CORDLESS POWER HAND TOOL AND OTHER LOADS

RELATED APPLICATION

This application claims the benefit of the filing date of U.S. Provisional Application No. 60/139,514, filed Jun. 16, 1999 now abandoned.

BACKGROUND

This application relates to battery or power packs of the rechargeable type and, in particular, to lead-acid battery packs.

It is known to provide battery packs, i.e., compact arrangements of one or more battery cells, for various DC power delivery applications. Such battery packs are, for example, commonly used for powering cordless power tools. In recent years battery packs have also been provided for use in jump-starting automotive vehicles. These latter types of battery packs typically use lead-acid battery cells. Such lead-acid battery cells are sold, for example, by Johnson Controls Inc. under the designation "Inspira" and by Bolder Technologies under the designation "Bolder 9/5 sub-C TMF"(Thin Metal Film).

The battery packs used for cordless power tools typically use NiCad battery cells, but there are circumstances where it may be advantageous to use a lead-acid battery source for powering a cordless power tool. Heretofore, lead-acid battery packs have not been readily adaptable for use with cordless power tools.

SUMMARY

This application discloses an improved battery pack arrangement of the rechargeable type, which avoids disadvantages of prior battery packs, while affording additional structural and operating advantages.

An important feature is the provision of a rechargeable battery pack arrangement which is readily adaptable for use in multiple applications, including powering of cordless power tools and jump-starting automotive engines.

In connection with the foregoing feature, another feature is the provision of a battery pack which can be directly plugged into a cordless power tool and can also be plugged into a jump-starting adapter housing.

Another feature is the provision of a battery pack of the type set forth, which can be attached to a cordless power tool without the encumbrance of battery jump-starting cables.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
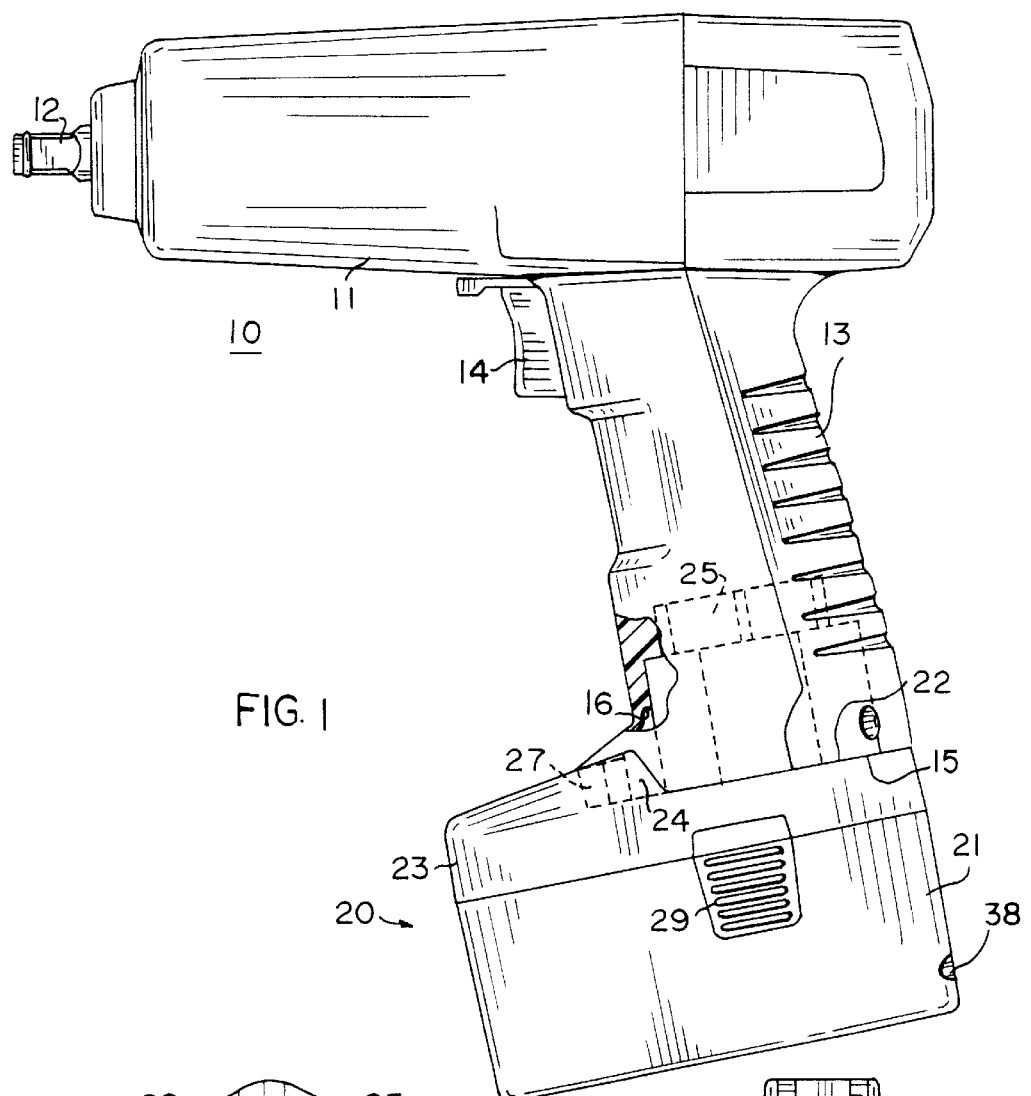
FIG. 1 is a side elevational view, in partial section, of a cordless power tool incorporating a battery pack.
Figure 7:
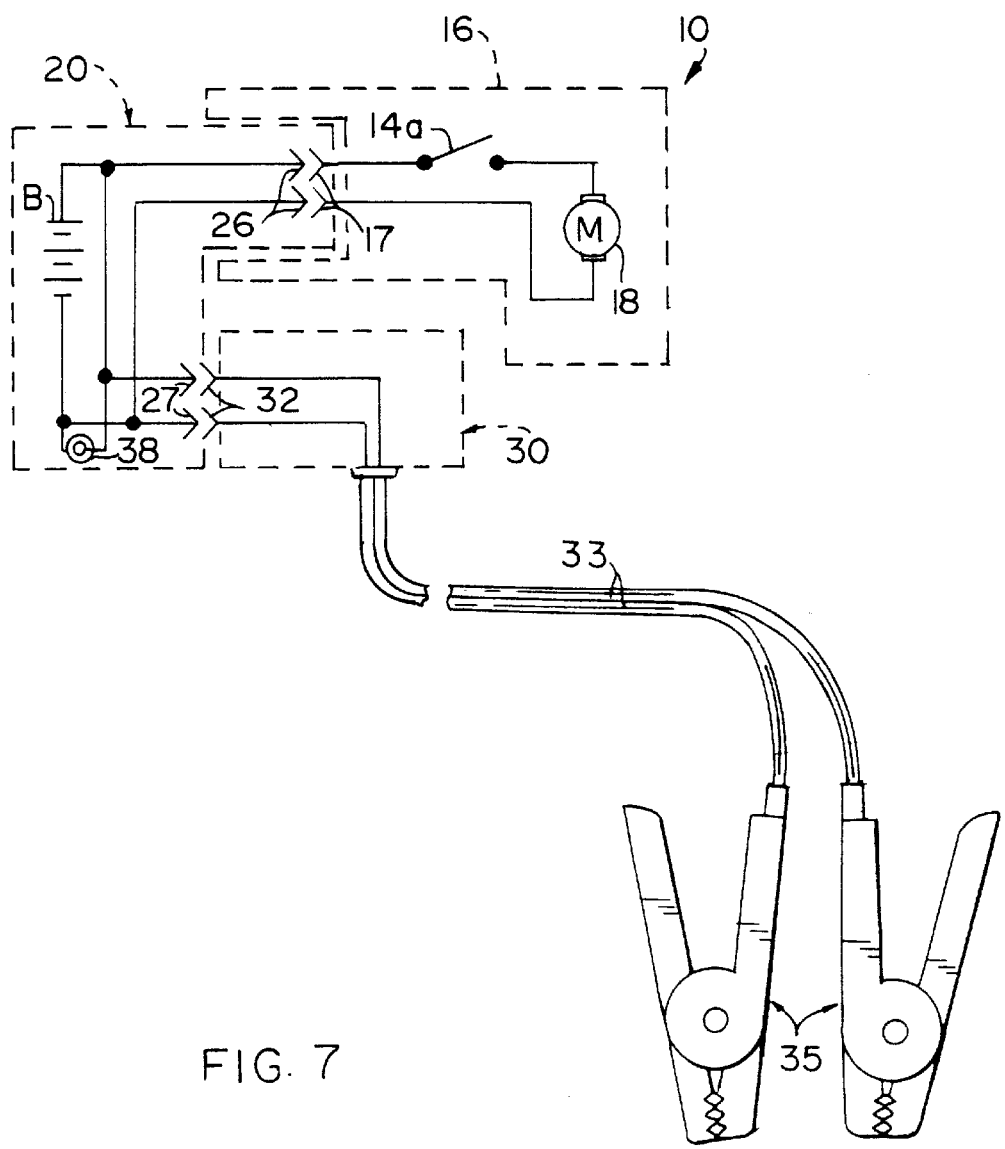
FIG. 7 is a schematic circuit diagram of the electrical components of the battery pack system of FIGS. 1 and 6.

Referring to FIGS. 1 and 7, there is illustrated a cordless power tool, generally designated by the numeral 10, of a type with which the battery pack disclosed herein may be used. Simply for purposes of illustration, the power tool 10 is shown as being of the well-known "pistol grip" type, having an elongated barrel 11, which typically houses a DC motor 18 and associated drive mechanism coupling the motor to an output drive member 12. In the illustrated embodiment, the tool 10 is in the nature of an impact wrench and the output member 12 is a square drive. However, it will be appreciated that the tool could be any of a number of other types of tools, including various types of drills, drivers, and the like. Integral with the barrel 11 and depending therefrom is an elongated handle 13 provided at the upper end thereof with an operating trigger 14 for actuating a control switch 14a. The handle 13 has a distal end surface 15 in which is formed a battery pack well or cavity 16 with terminal contacts 17 for receiving therein the coupling portion of an associated battery pack, in a well-known manner.

Figure 2:
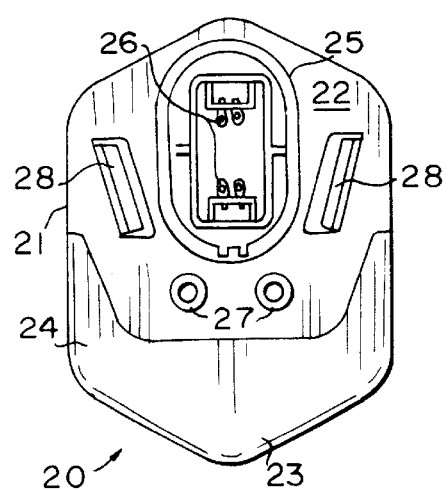
FIG. 2 is a top plan view of the battery pack of FIG. 1.
Figure 3:
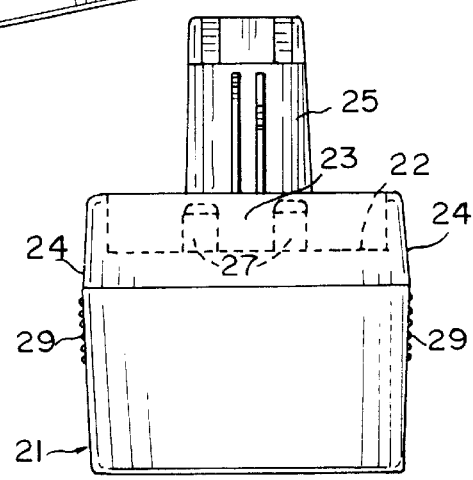
FIG. 3 is a front elevational view of the battery pack of FIG. 2.

Referring also to FIGS. 2 and 3, there is illustrated a battery pack, generally designated by the numeral 20. The battery pack 20 is designed to be similar in appearance to standard battery packs designed for use with the power tool 10, such as those sold by Snap-on Tools Company under the designations CTB100 and CTB212, and which are generally of the type illustrated in U.S. Pat. No. 5,213,913, the disclosure of which is incorporated herein by reference. The battery pack 20 includes a battery B (FIG. 7), which may comprise thin metal film lead-acid battery cells, which may be of types sold by Johnson Controls Inc. under the designation "Inspira," or by Bolder Technologies under the designation "Bolder 9/5 sub-C TMF."

The battery pack 20 has a housing 21 which encloses the battery B and has a substantially flat, planar upper surface 22. The housing 21 has an upstanding front wall 23 which extends above the surface 22 and has a pair of wings 24 which extend rearwardly about half the front-to-back length of the housing 21. Projecting upwardly from the surface 22 adjacent to the rear end thereof is a coupling turret or post portion 25, substantially oval in transverse cross section and designed to substantially match in size and shape of the corresponding turret of the prior-art battery packs commonly used with the power tool 10. Disposed in the upper end of the turret 25 are electrical contacts 26 for connecting to associated mating contacts 17 at the upper end of the battery pack well 16 for electrically connecting the battery pack 20 to the power tool 10, in a well-known manner.

The battery pack 20 is also provided with a second set of male contacts 27 projecting upwardly from the surface 22 adjacent to the forward end thereof, the contacts 27 not extending above the upper edges of the wings 24 and the front wall 23. As in the prior battery packs, the battery pack 20 is provided with a pair of latches 28 adapted to engage associated latch keepers (not shown) in the tool handle 13 and respectively manually actuated by latch buttons 29, all in a known manner, as described in the aforementioned U.S.

Pat. No. 5,213,913, for releasably connecting the battery pack 20 to the tool handle 13. The size and shape of the upper surface 22 of the battery pack housing 21 may be designed to mate with and receive the end surface 15 of the power tool handle 13, with the contacts 27 received in the battery pack well 16 when the battery pack 20 is mounted in place on the handle 13, as illustrated in FIG. 1. However, it will be appreciated that, when the battery pack 20 is attached to the power tool 10, the contacts 27 are not used and electrical connection to the power tool 10 is solely through the turret 25, as in prior-art battery packs.

Figure 4:
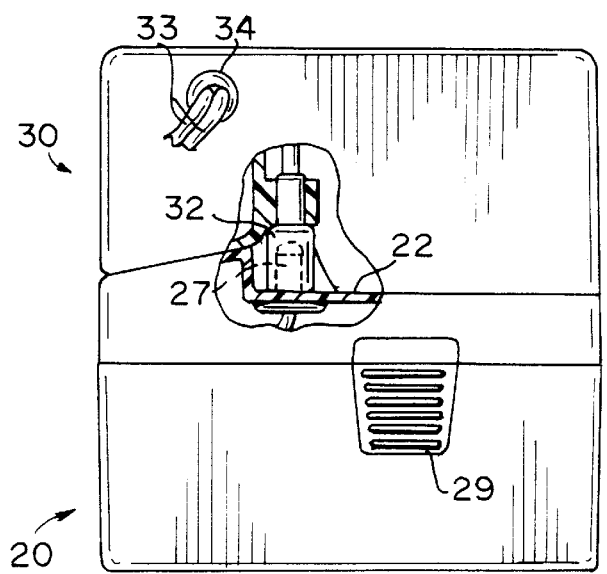
FIG. 4 is a side elevational view, with portions broken away, of the battery pack of FIGS. 1–3 connected to a jump starting adapter housing.
Figure 5:
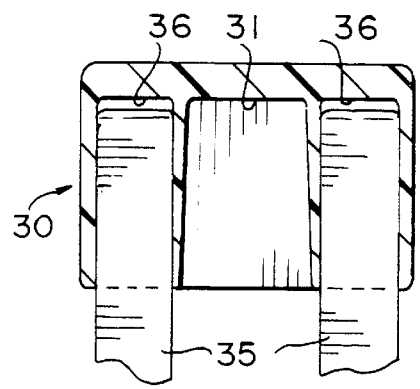
FIG. 5 is a vertical section through the adapter housing of FIG. 4 with jumper clamps stowed therein.
Figure 6:
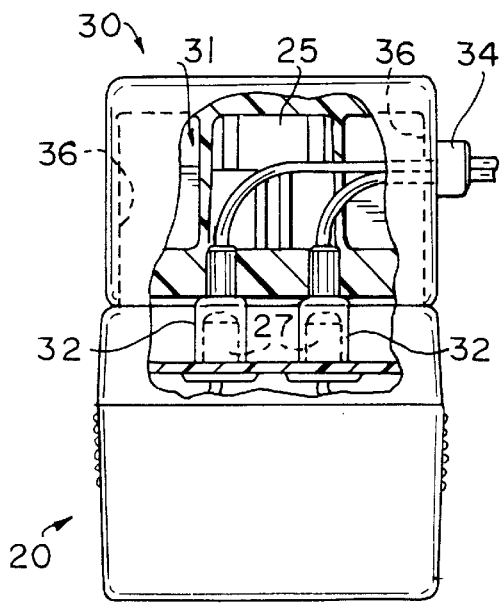
FIG. 6 is a front elevational view, with portions broken away, of the battery pack/jump starting adapter housing of FIG. 4.
Figure 6:
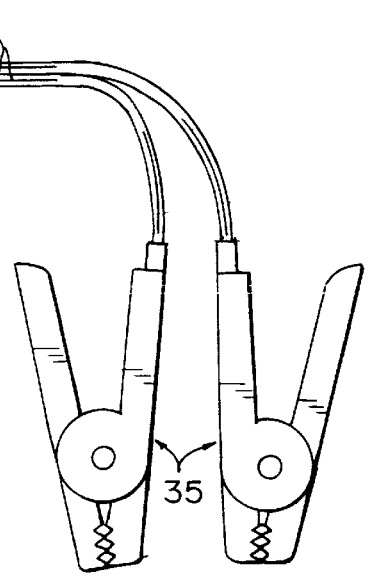

Referring now to FIGS. 4–6, there is illustrated a jump start adapter housing 30, for connection to the battery pack 20 when it is to be used for jump starting an automotive vehicle. The jump start adapter housing 30 may be of any of a number of different shapes and sizes, but is generally designed to fit over the surface 22 of the battery pack 20. The housing 30 may have a turret well or receptacle 31 therein for receiving the battery pack turret 25 and is also provided with a pair of female contacts 32 for respectively mateably engaging the male contacts 27 of the battery pack 20 for electrical connection thereto (see FIGS. 6 and 7). The female contacts 32 are, respectively, connected to cables 33 which extend out through an opening in the housing 30, as through a suitable grommet 34 or other suitable strain relief device. The other ends of the cables 33 are, respectively, connected to clamps 35 for connection to the terminals of an automotive battery in a known manner. The housing 30 may have a pair of clamp pockets 36 on either side of the turret well 31, in which the clamps 35 can respectively be disposed when the jump start housing 30 is not in use, as shown in FIG. 5.

It will be appreciated that the battery cells in the battery pack 20 are of the rechargeable type. When the battery pack 20 is being used with the jump start housing 30 for jump starting an associated automotive vehicle, the quickest way to recharge the battery pack 20 is by leaving it connected to the battery of the associated vehicle after it is running, whereupon the battery pack 20 is recharged by the charging system of the vehicle. Recharging in this matter can be accomplished in a few minutes, depending on the size of the battery. When the battery pack 20 is being used with a cordless power tool, it can be recharged by the use of battery chargers of the type designed for use with the prior-art battery packs. These chargers operate from a standard 120VAC household supply and typically are provided with a socket into which the battery pack turret 25 is received. Recharging in this manner can typically be accomplished in about an hour. Alternatively, various types of trickle charge devices could be utilized for recharging the battery pack 20 and, for this purpose, the battery pack 20 may be provided with a charging port 38 (see FIGS. 1 and 7).

While in the illustrated embodiment the battery pack 20 is provided with two sets of contacts 26, 27 for respectively coupling to a cordless power tool or to the jump start adapter housing 30, it could, alternatively, be provided with only one of these sets of contacts. If only the turret 25 is used, then the jump start adapter housing 30 would be modified to have a set of contacts like those in the cordless power tool 10 for electrical coupling to the contacts in the turret 25. Alternatively, if only the contacts 27 are used, the power tool could be modified to have a set of contacts designed for connection to the contacts 27.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

I claim:

1. A battery pack for use with at least an associated cordless power hand tool comprising:
 a housing,
 at least one battery cell disposed in the housing,
 a post portion projecting from the housing and having first battery pack terminals thereon electrically connected to the at least one battery cell,
 the post portion being adapted to be received in a cavity in the associated cordless power hand tool in a mounted position removably carried by the hand tool with the first battery pack terminals disposed for electrical connection to terminals in the hand tool, and
 second battery pack terminals on the housing electrically connected to the at least one battery cell and adapted for connection to a load.

2. The battery pack of claim 1, wherein the second battery pack terminals are spaced from the post portion.

3. The batter pack of claim 1, wherein all of the first and second battery pack terminals are male terminals.

4. The battery pack of claim 1, and further comprising a latch mechanism on the housing for latching the battery pack to the associated hand tool.

5. The battery pack of claim 4, wherein the latch mechanism includes a latch member projecting from the housing and an actuator coupled to the latch member for a manual actuation thereof.

6. The battery pack of claim 1, and further comprising a charger port on the housing electrically connected to the at least one battery cell.

7. The battery pack of claim 1, wherein the at least one battery cell is a lead-acid cell.

8. A battery pack system for use with at least an associated cordless hand-held power hand tool comprising:
 a battery pack housing,
 at least one battery cell disposed in the battery pack housing, and
 a connecting portion projecting from the battery pack housing and having battery pack terminals electrically connected to the at least one battery cell,
 the connecting portion being adapted to be received in a cavity in the associated cordless hand-held power hand tools in a mounted position removably carried by the hand tool, the combined battery pack housing and at least one battery cell having a size and weight so as to permit land-held portable operation of the tool with the battery pack housing mounted thereon and extending outwardly from the cavity; and
 an adapter housing defining a receptacle for receiving therein the connecting portion of the battery pack housing and having a connector adapted to be electrically connected to a load, and
 a coupler on the adapter housing electrically connected to the connector and adapted for electrical connection to battery pack terminals when the connecting portion of the battery pack housing is received in the receptacle,
 the battery pack terminals being disposed for electrical connection to terminals in the hand tool independently of the adapter when the connecting portion is disposed in its mounted position.

9. The system of claim 8, wherein the connecting portion is a post projecting from the battery pack housing.

10. The system of claim 9, wherein battery pack terminals are on the post.

11. The system of claim 8, wherein the connector includes cables extending from the adapter housing and respectively having connector clamps at the distal ends thereof.

12. The system of claim 11, wherein the adapter housing defines pockets for respectively receiving the clamps when not in use.

13. The system of claim 8, wherein the battery pack terminals include first terminals disposed for electrical connection to terminals in the hand tool when the connecting portion is received in the hand tool cavity, and second terminals disposed for electrical connection to the coupler when the connecting portion is received in the receptacle.

14. The system of claim 8, wherein the at least one battery cell is a lead-acid cell.

15. A battery pack system for use with at least an associated cordless power hand tool comprising:

a battery pack housing, at least one battery cell disposed in the battery pack housing, a post portion projecting from the battery pack housing and having first battery pack terminals thereon electrically connected to the at least one battery cell, the post portion being adapted to be received in a cavity in the associated cordless power hand tool in a mounted position removably carried by the hand tool with the first battery pack terminals disposed for electrical connection to terminals in the hand tool, and second battery pack terminals on the battery pack housing electrically connected to the at least one battery cell; and an adapter housing defining a receptacle for receiving therein the post portion of the battery pack housing and having a connector adapted to be electrically connected to a load, and a coupler on the adapter housing electrically connected to the connector and adapted for electrical connection to the second battery pack terminals when the post portion of the battery pack housing is received in the receptacle.

16. The system of claim 15, wherein the second battery pack terminals are spaced from the post portion.

17. The system of claim 16, wherein the second battery pack terminals are male terminals, the coupler including sockets respectively adapted for receiving the second battery pack terminals when the post portion is disposed in the receptacle.

18. The system of claim 17, wherein the connector includes cables extending from the adapter housing and connector clamps respectively connected to the distal ends of the cables.

19. The system of claim 18, wherein the adapter housing defines pockets respectively adapted for receiving the clamps therein when not in use.

20. The system of claim 15, and further comprising a latch mechanism on the battery pack housing for latching the battery pack housing to the associated hand tool.

* * * * *

UNITED STATES PATENT AND TRADEMARK OFFICE
CERTIFICATE OF CORRECTION

PATENT NO. : 6,562,509 B1
DATED : May 13, 2003
INVENTOR(S) : Eggert

It is certified that error appears in the above-identified patent and that said Letters Patent is hereby corrected as shown below:

Column 4,
Line 25, "batter" should be -- battery --.
Line 52, "land-held" should be -- hand-held --.

Signed and Sealed this

Fifteenth Day of February, 2005

JON W. DUDAS
*Director of the United States Patent and Trademark Office*